(12) United States Patent
Meinl et al.

(10) Patent No.: US 6,349,572 B1
(45) Date of Patent: Feb. 26, 2002

(54) METHOD OF COMPRESSION BUNDLING OF OPTICAL FIBER

(75) Inventors: Juergen Meinl, Hohenstein; Thomas Henrich, Steinbach, both of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/452,419

(22) Filed: Dec. 1, 1999

(30) Foreign Application Priority Data

Dec. 4, 1998 (DE) .......................................... 198 55 958

(51) Int. Cl.[7] .............................................. C03B 37/15
(52) U.S. Cl. ................................ 65/410; 65/409; 23/27
(58) Field of Search ................................... 65/409, 410

(56) References Cited

U.S. PATENT DOCUMENTS

| | | | |
|---|---|---|---|
| 2,979,632 A | * 4/1961 | MacNeille | |
| 3,301,648 A | * 1/1967 | Sheldon | |
| 3,355,273 A | * 11/1967 | Siegmund et al. | |
| 3,622,291 A | * 11/1971 | Fleck et al. | 65/393 |
| 3,713,729 A | * 1/1973 | Inoue et al. | 8/158 |
| 3,729,299 A | 4/1973 | Norton | |
| 3,779,729 A | * 12/1973 | Hicks, Jr. | 65/410 |
| 3,859,071 A | * 1/1975 | Beasley et al. | 65/508 |
| 5,045,100 A | * 9/1991 | Smith et al. | 65/410 |

FOREIGN PATENT DOCUMENTS

| | | |
|---|---|---|
| DE | 26 30 730 | 1/1977 |
| DE | 32 47 500 A1 | 7/1984 |
| DE | 37 44 367 C1 | 8/1989 |
| DE | 196 04 678 A1 | 8/1996 |
| EP | 0 595 246 A1 | 5/1994 |
| JP | 3 144 601 | 6/1991 |

* cited by examiner

*Primary Examiner*—John Hoffmann
(74) *Attorney, Agent, or Firm*—Michael J. Striker

(57) ABSTRACT

The method of making an optical fiber bundle (1) from individual optical fibers with good optical properties and a wider applicability includes temporarily mechanically holding individual optical fibers together and pushing them in a snug fit in a single metallic sleeve (3) made from a metallic material that has a sufficient high temperature strength at a forming temperature of the optical fiber glass; installing the optical fiber bundle (1) in a clamping device (4) in order to hold the optical fiber bundle fixed in an axial and radial direction; heating the end of the clamped optical fiber bundle (1) to the forming temperature, pressing the single metallic sleeve (3) on the optical fiber bundle and compressing the end of the optical fiber bundle in the single metallic sleeve with a forming tool (5) to shape or form the individual optical fibers in a hexagonal packing; cooling the shaped end of the optical fiber bundle (1) and removing the optical fiber bundle from the clamping device (4). The invention also includes the resulting optical fiber bundle and an apparatus for performing the method.

10 Claims, 4 Drawing Sheets

METHOD OF COMPRESSION BUNDLING OF OPTICAL FIBER

BACKGROUND OF THE INVENTION

1. Field of the Invention

The present invention relates to a method of making an optical fiber bundle, comprising individual optical fibers, which are compressed with each other at a common end in a common metallic sleeve, and shaped or formed by application of temperature and pressure. The invention also relates to an apparatus for performing this method. The invention further relates to an optical fiber bundle, which comprises a plurality of individual optical fibers, which are compressed and melted together at a common end in a hexagonal packing.

2. Prior Art

Frequently a flexible fiber optic light guide, comprising a plurality of individual optical fibers, a so-called optical fiber bundle, are used for light transmission. The individual fibers are usually combined at a common end in a sleeve, which, for example, is attached in a lighting apparatus for illumination.

The combination of the individual fibers at a common end to form a bundle requires special design engineering attention.

It is known in the prior art to make an optical fiber bundle by gluing the individual fibers together and bonding them in a sleeve that is pushed onto them. This widely used method has the disadvantage that the adhesive that is used limits the temperature resistance, the packing density and thus the optical transmission which is possible through the optical fiber bundle, because the individual optical fibers retain their circular cross-sectional shape and rest against each other only point-wise with free space. Also the chemical stability is limited which similarly reduces the range of applications in which this type of optical fiber bundle can be used.

Methods are known in which the individual fibers are melted with the sleeve and each other in a common sleeve. The advantages of this sort of optical fiber bundle include above-all its higher temperature resistance (adhesive-free), higher light transmission, because more individual fibers are present in a cross-section by which hexagonal packing arises when the fibers are melted and compressed, and improved resistance to chemical attack, which is especially noteworthy for thermal disinfection applications and generally for sterilization in medical applications.

Processes are described in DE 26 30 730, in which a heat-softening sleeve is pressed on the optical fiber bundle. The individual fibers are then shaped hexagonally and there are no intervening free spaces between them. However in this prior art process melting between the individual optical fibers does not occur.

Glass sleeves would be advantageous to use because of their lower viscosity properties, but especially have the following disadvantages:
shaping tools cause imperfections and defects during sealing when used in glass sleeves;
the optical fibers are extremely impact- and shock-sensitive when used in glass sleeves (danger of chipping).

In the known method in principle metal sleeves with glass-like thermal and viscosity properties, i.e. the so-called heat-softening metals, could be used.

However these heat-softening metals have disadvantageous thermal and mechanical loads and are not usable in practice.

For protection of the glass sleeve the known method provides an outer metal sleeve surrounding the glass sleeve. The glass sleeve is pushed into a shaping or forming conical end of the outer metal sleeve and is compressed there by means of a slidable press-metal sleeve pushed on the fiber bundle. Then glass sleeve (and the press-metal sleeve) is connected with the outer metal sleeve by gluing or softened glass.

A formation of the end of the optical fiber bundle in this manner however has the following serious disadvantages:
The outer metal sleeve must be sufficiently thick-walled in order to compensate for thermal stresses (compression glass melt). This has the disadvantage that the usable optical surface area is small, in relation to the outer diameter of the metal sleeve.
An additional pressing tool that remains in the light guide ends is required to bring the inner glass sleeve into the outer metal sleeve. Problems result during centering of the optical fiber bundle in the softening glass sleeve, which act disadvantageously on the optical axis.
On inserting the inner glass sleeve into the outer metal sleeve furthermore no melting zone is formed, in which the individual fibers are parallel to each other. The conical convergence of the optical fiber bundle at their ends acts disadvantageously on the reflection properties of the optical fiber bundle.
only bundle diameters up to 10 mm can be made by this technique.
The provision of the outer metallic sleeve finally leads to an end portion of the optical fiber bundle that has three sleeves, namely
the glass sleeve (or alternatively a metallic sleeve made of a heat softening material),
a Press-sleeve,
the outer metallic sleeve, i.e. to a complex expensive termination of the optical fiber bundle as well is as the above-mentioned disadvantages.

There are additional disadvantages. In the known case a forming step, namely the compressing and tapering of the optical fiber bundle with heat and pressure, must be performed before putting on the glass sleeve (or alternatively the heat-softening metal sleeve).

DE 196 04 678 A1 describes a process in which the individual optical fibers are melted together at the end of the optical fiber bundle. Furthermore the entire optical fiber bundle (up to 30 m long) must be rotated to melt the common end, which leads to great manipulation difficulties and to limitations for more complex or larger components. In the known method the individual optical fibers and tools are placed in an electrically heated oven at the softening temperature. The melting process or softening process requires several hours for the case of large diameter components. A definite temperature adjustment of the temperature of the individual optical fibers to be melted is not possible because of the oven structure. Also only easily shaped materials (brass, nickel silver) with a very thin sleeve wall thickness can be used.

SUMMARY OF THE INVENTION

It is an object of the present invention to provide an improved method for making an optical fiber bundle based on the method according to German Patent Document DE 26 30 730 A1, so that an optical fiber bundle with improved optical properties and a wider range of possible applications results in a simple manner with simple means.

It is another object of the present invention to provide an improved optical fiber bundle having improved optical properties and a wider range of possible applications than the optical fiber bundles currently available in the art.

It is a further object of the present invention to provide an apparatus for making the optical fiber bundle according to the improved method for making it.

According to the invention the method of making an optical fiber bundle from a plurality of individual optical fibers that attains the above objects includes:

temporarily mechanically holding individual optical fibers together in a round and densely packed fiber bundle and pushing it in a snug fit in a single metallic sleeve made from a metallic material that has a sufficient high temperature strength at a forming temperature of the glass in the optical fibers;

installing the optical fiber bundle in a clamping device with the clamping device arranged in the vicinity of the single metallic sleeve in order to hold the optical fiber bundle fixed in an axial and radial direction;

heating the clamped end of the optical fiber bundle pushed in the single metallic sleeve to the forming temperature;

compressing the heated end of the optical fiber bundle in the single metallic sleeve to shape or form the individual optical fibers in a hexagonal packing and pressing in the metallic sleeve on this hexagonal packing, without sealing the single metallic sleeve to the optical fiber bundle;

cooling the shaped end of the optical fiber bundle with the individual optical fibers in the hexagonal packing; and removing the optical fiber bundle from the clamping device.

The apparatus according to the invention for performing the above-described method for making the optical fiber bundle includes a clamping device for stable holding of a single metallic sleeve made of metallic material with the optical fiber bundle mechanically held together and inserted completely in a cylindrical interior passage provided in the single metallic sleeve; and an axially movable forming tool provided with an interior cavity tapered in a motion direction of the forming tool and shaped so that by moving the forming tool toward the end of said optical fiber bundle with the single metallic sleeve this end of the optical fiber bundle is compressed in a predetermined manner; and an induction heater arranged in the vicinity of the forming tool so that the forming tool is heated by operation of the induction heater.

The invention also includes the optical fiber bundle made by the method according to the invention. This optical fiber bundle comprises a plurality of individual optical fibers melted together with each other at one end of the optical fiber bundle and a single metallic sleeve around the one end of the optical fiber bundle in which the individual optical fibers are inserted or pushed and compressed to form a hexagonal packing, the single metallic sleeve is made of a metallic material with a high temperature strength sufficient for heating to a forming temperature for the optical fibers and with a cylindrical interior passage having a substantially circular cross-section, the single metallic sleeve compressed on the hexagonal packing is releasable in a nondestructive manner and the individual optical fibers in the hexagonal packing extend in an axial direction parallel to each other in the vicinity of the metallic sleeve.

The invention, in contrast to that disclosed in DE 26 30 730 A1, has no glass sleeve, but instead a metallic sleeve, which is made from a material that has a sufficient heat resistance at the forming or shaping temperature of the glass, i.e. a material which would not be usable in the prior art, since it would need to be a thermally softened metal.

In the case of the invention only a single sleeve made of heat-resistant metal is used, which has a through-going interior passage having a circular cross-section, i.e. it is a hollow cylinder and is exposed to only a single compression event or process, since the individual optical fibers are only held together by mechanical means and are directly or immediately pushed into the single high-temperature resistant metallic sleeve for compression, i.e. without preliminary shaping steps.

The following advantages result from the features of the invention:

optical fiber bundle with diameters up to 30 mm can be melted and provided with a terminal sleeve.

a larger optically active diameter in relation to the actual sleeve outer diameter is obtainable, i.e. the ratio of optically active bundle diameter to sleeve outer diameter is $\geq 0.8$.

an outstanding transmission that is substantially larger than that obtainable with an optical fiber bundle in which the individual optical fibers are glued together is obtainable with an optical fiber bundle according to the invention having the same optically active diameter, because of the optimum hexagonal packing of the individual optical fibers over the entire cross-section of the optical fiber bundle according to the invention;

a most wide variety of sleeve materials are usable, especially corrosion-resistant materials, e.g. stainless steel for medical applications, and also nonferrous (NF) metals, such as brass and nickel silver.

no other parts are necessary for the melting step except for the metallic sleeve and the optical fiber bundle. To make the melted end of the optical fiber bundle no additional parts, such as an inner glass sleeve or pressing piston, are used, which are part of prior art techniques or are lost in the process, in addition to the metallic sleeve and the optical fiber bundle.

the length of the melted portion is freely selectable.

the heating for the melting/shaping of the light-conducting individual optical fibers can be performed so that a more rapid and reproducible forming or shaping process is guaranteed. Because of this aspect of the inventive process the shaping results in an entire optical fiber bundle of approximately hexagonally packed individual optical fibers and of very large diameter, up to 30 mm. This causes the fibers in the melted region to lie sufficiently parallel to each other and the melted region has very good centricity, which makes the propagation characteristics of the optical fiber bundle substantially better.

no strong bond between the outer metallic sleeve and the melted optical fiber bundle is produced by the shaping or forming process of the invention. Thus the optical fiber bundle can be made without the metallic sleeve simply by removing the metallic sleeve after the method according to the invention has been performed.

the regions of the optical fibers close to the sleeve wall are not damaged by the method.

According to a preferred embodiment of the method according to the invention a portion of the metallic sleeve that is exposed to the shaping process is provided with a coating, inside and outside, which serves as a separating layer between the shaped optical fiber bundle inside the sleeve and as a lubricating agent between the sleeve exterior wall and a compressing tool. This feature of the invention makes the shaping process with the appropriate tool easier and guarantees a nondestructive separation of the metallic sleeve. The coating occurs in a simple manner by dipping the metallic sleeve in a coating material, which is preferably formed by a suspension of boron nitride in ethanol. Of course other conventional coating methods may also be used as well as conventional high temperature-resistant coating materials, which can act as separating layer and lubricating layer, such as graphite, gold, etc.

A simple insertion of the optical fiber bundle into the metallic sleeve is attainable when the individual optical fibers forming the optical fiber bundle are held together temporarily by a bundling agent (e.g. an adhesive strip, string, wire, cable binder), so that the bundling agent can be easily manually removed or the bundling agent is stripped away automatically by the sleeve when the optical fiber bundle is inserted in the metallic sleeve.

A faster and sufficiently reproducible shaping process may be obtained, when the heating of the end of the optical fiber bundle inserted in the metallic sleeve is brought to a forming temperature by inductively generated heat, when a metallic heating element in contact with that end is inductively heated. The forming temperature is preferably in a range from 600 to 700° C., a temperature at which the metallic material of the sleeve is still resistant to the heating, so that no strong bond is formed between the melted optical fibers and the outer metallic sleeve.

Besides the inductive heating other methods of producing the required forming temperature are also possible. However the inductive heating has a number of advantages. For example, in a preferred embodiment of the method the shaped end of the optical fiber bundle is cooled by gradual reduction of the input inductive power. Furthermore the inductive heating allows the heating element to provide an indirect heating of the optical fiber bundle at the same time as it is compressed by pressing it with this heating element which has a predetermined interior shape for this purpose. Because of that feature the same forming tool can be used to heat the end of the inserted optical fiber bundle to the forming temperature and for compressing its heated end.

According to another preferred embodiment of the invention the apparatus for performing the method is formed so that the interior cavity in the forming tool has a first cylindrical section at an open end thereof which has an inner diameter only slightly greater than the outer diameter of a cylindrical portion of the metallic sleeve receiving the optical fiber bundle prior to heating and compressing. The interior cavity in the forming tool includes a second cylindrical section at an end of the forming tool opposite from or remote from the open end and the second cylindrical section has an inner diameter corresponding to a predetermined desired diameter of the optical fiber bundle after the compressing. The interior cavity in the forming tool also includes a conical section connecting the first cylindrical section and the second cylindrical section. This particular specific structure for the forming tool permits the forming tool to be used for the various steps in the method for forming the optical fiber bundle according to its axial position for the end of the optical fiber bundle.

The interior surfaces of the second cylindrical and the conical sections of the forming tool are preferably hardened and polished because of the compressing step in the method.

In order to obtain the optimum hexagonal packing of the individual optical fibers over the entire cross-section of the light-guiding optical fiber bundle the above-described forming tool is structured so that the inner diameter of the second cylindrical section corresponds to the diameter of the optical fiber bundle less a distance corresponding to the hollow space between the optical fibers prior to heating and compressing, i.e. about 85% of the outer diameter of the metallic sleeve with conventional individual optical fibers having a diameter of about 30 µm to 150 µm.

In cases in which the terminal sleeve must have an especially small diameter, the diameter the second cylindrical section can be reduced still further so that a part of the fiber material, especially the fiber outer jacket, can be squeezed out of the sleeve. The exact extent depends on the nature and the structure of the individual fibers and must be determined from case to case. Generally the inner diameter can be reduced about 10% without difficulties.

In a preferred embodiment of the method of the invention temperature control of the forming or shaping temperature is provided so that a very good reproducible process control results, i.e. a sufficiently reproducible forming process. This is accomplished by providing a temperature controlling device for adjusting of the forming temperature in connection with and in the vicinity of the forming tool.

According to another preferred embodiment the metallic sleeve has a thick-walled section with a formed or molded element for a positive-locking engagement with a clamping device in order to guarantee that the metallic sleeve will reliably take the forming forces applied to it. The end of the light-guiding fiber optic bundle to be shaped is thus received in a thin-walled section of the metallic sleeve that does not impede the thermal shaping process because of its wall thickness. The term "thick-walled" means that the thick-walled section has a thicker wall than the corresponding thin-walled section. The term "thin-walled" means thin in relation to the thick-walled section.

According to another preferred feature of the invention the sleeve material is made from a corrosion-resistant stainless steel or a nickel-iron alloy. Also other metallic materials with suitably high-temperature resistance are usable, especially according to the range of applications foreseen for the optical fiber bundle.

BRIEF DESCRIPTION OF THE DRAWING

The objects, features and advantages of the invention will now be illustrated in more detail with the aid of the following description of the preferred embodiments, with reference to the accompanying figures in which:

FIG. 2B.

DESCRIPTION OF THE PREFERRED EMBODIMENTS

The method according to the invention will be explained in a general manner with reference to FIG. 1.

Figure 1:
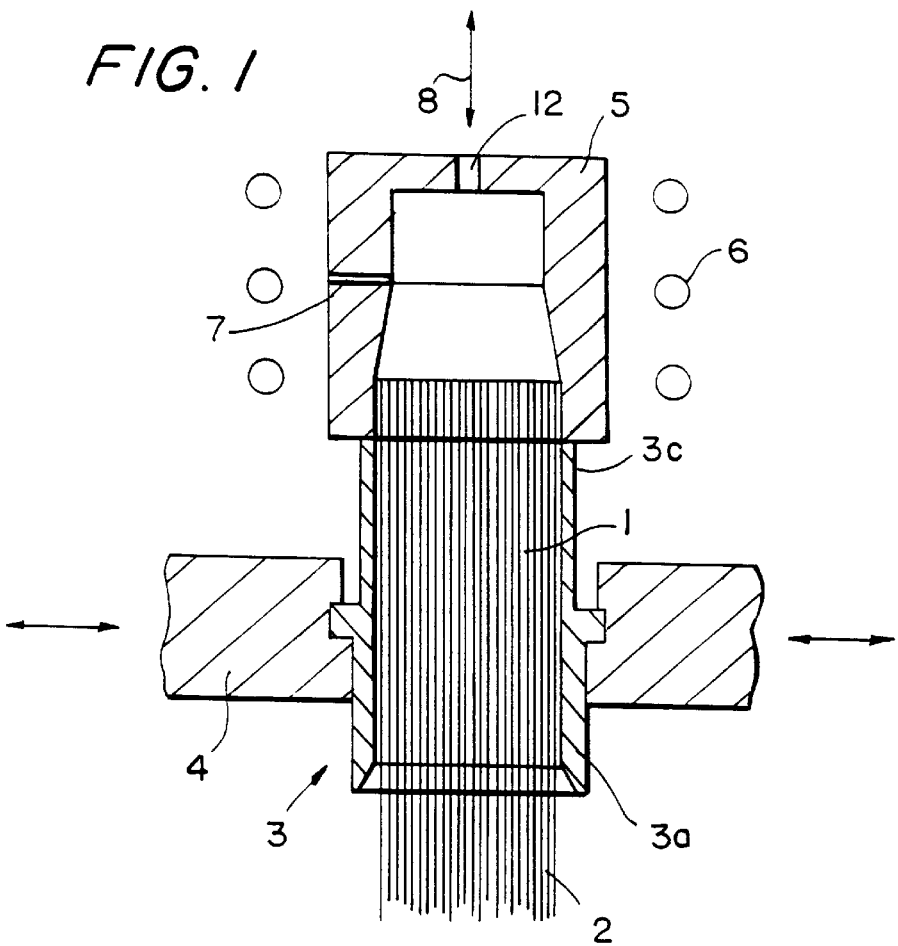
FIG. 1 is a schematic cross-sectional view of an optical fiber bundle inserted in a metallic sleeve which is received in a clamping device with a forming tool placed on the end of the optical fiber bundle.

An optical fiber bundle 1 made of a number of optical fibers 2 is shown schematically in FIG. 1. The ends of the optical fibers 2 should be melted with each other. For this purpose next a metallic sleeve 3 with an interior passage having a circular cross-section as shown in FIGS. 2A, 5A and 2B,5B is provided. This metallic sleeve 3 comprises a thick-walled section 3a with a circumferential collar or shoulder 3b and a thin-walled section 3c. The metallic sleeve 3 is pushed on the optical fiber bundle 1. The individual optical fibers 2 thus terminate flush with the upper edge of the metallic sleeve 3 or its thin-walled section 3c.

The metallic sleeve 3 provided with the optical fiber bundle 1 is fixed in an axial and radial direction by means of a horizontally movable clamping device 4 which fits together with the collar or shoulder 3b acting as mounting or connecting elements.

After that a forming tool 5 operating simultaneously as a heating element is placed on the fixed metallic sleeve 3.

The forming tool 5 is brought to a forming temperature characteristic of glass of about 650° C. with an inductive heater 6. The heating of the optical fiber bundle 1 occurs indirectly by means of the heat radiation and heat conducted from the forming tool 5. The required forming temperature is monitored actively by means of a temperature-measuring element 7. On reaching the required forming temperature the forming tool 5 is pressed by an axial downward motion on the metallic sleeve 3 and thus on the optical fiber bundle 1 with the forming or shaping force indicated with the arrow 8. The metallic sleeve 2 and the optical fiber bundle 1 take the shape of the inner contour of the forming tool 5.

After the forming process the forming tool 5 is withdrawn from the metallic sleeve 3, no more contact between the metallic sleeve 3 and the forming tool 5 occurs. The forming tool 5 occupies the position in which it sits over the fastened metallic sleeve 3 protecting it.

Finally, a cooling phase occurs, in which the forming tool 5 and the formed end of the optical fiber bundle 1 are cooled below a temperature$<<T_g$.

After the ending of the cooling stage the forming tool 5 is completely removed from the shaped end of the optical fiber bundle 1 and it is taken out of the clamping device 4.

In the following description the process is broken down into individual steps and the individual steps are explained further in detail with the aid of the individual steps.

The process steps are:
1. The metal sleeve 3 is coated.
2. The optical fiber bundle 1 is mounted in the metallic sleeve.
3. The optical fiber bundle assembled with the metallic sleeve is placed in the clamping device 4.
4. The forming tool 5 is inductively heated with the aid of the heating device 6.
5. The optical fiber bundle 1 is shaped or formed.
6. The optical fiber bundle 1 is cooled.
7. The optical fiber bundle 1 is removed from the clamping device 4.

FIRST STEP: COATING THE METALLIC SLEEVE

Figures 2A, 2B:
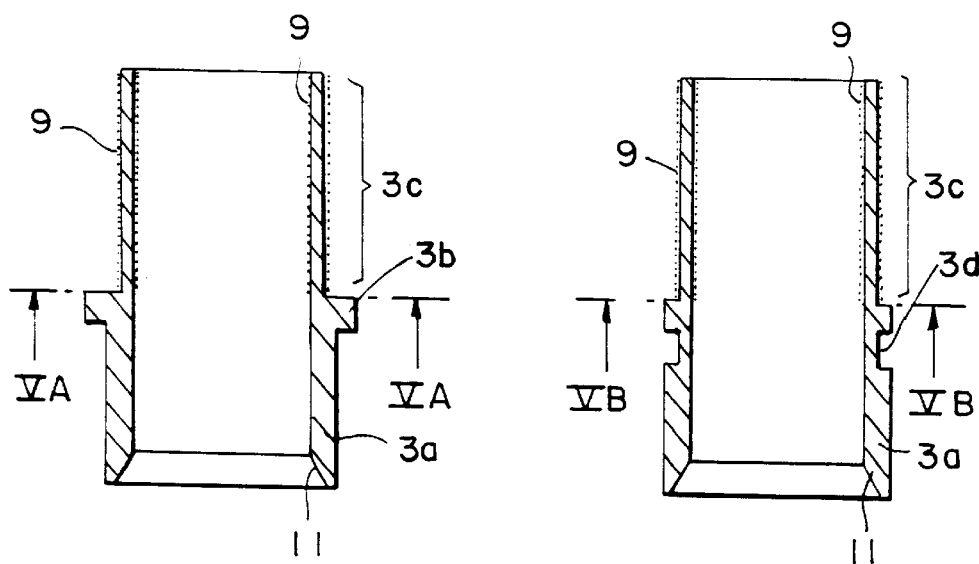
FIGS. 2A and 2B are respective schematic cross-sectional views of two different embodiments of the metallic sleeve, showing the coating of parts of these metallic sleeves.

This step is illustrated in FIGS. 2A and 2B.

The product of this step is the metallic sleeve 3. It has the following functions:
stabilization and protection of the end of the optical fiber bundle 1;
separation of the forming tool and the optical fiber bundle;
mechanical receipt and protection of the optical fiber bundle.

The collar 3b or alternatively, the groove 3d, as in the embodiment of FIG. 2B, takes the shaping or pulling off force from the forming tool 5.

The thin-walled part 3c of the metallic sleeve 3 has a wall thickness of 0.2 to 1.0 mm, preferably 0.5 mm.

Metals with sufficiently high heat resistance at the forming temperature (about 600 to 700° C.), preferably corrosion-resistant stainless steel, are considered as metals for the sleeve material. Furthermore metals with thermal expansion coefficients that are similar to those of glass fibers, preferably nickel/iron alloys, can be used.

The metallic sleeve 3 is accordingly provided with a coating 9, inside and outside, in its thin-walled section 3c, which is indicated by the dots symbolically in FIGS. 2A and 2B.

This coating 9 has the following functions:
a barrier layer between the melted shaped ends of the optic fibers and the shaped wall of the metallic sleeve 3; and
lubrication between the wall of the metallic sleeve 3 and the inner contour of the forming or shaping tool 5.

The material for the coating must thus have the following properties:
temperature resistance up to at least 800° C.;
uniform coating (<0.02 mm) on the inner and outer surface of the wall of the sleeve;
good resistance to being rubbed off the sleeve material;
no glass sealing properties;
good tribological properties between metal at temperatures up to at least 800° C.;
easy cleaning possibility for the metallic sleeve by the separating means;
as a material for the coating boron nitride powder is preferably put in solution with ethanol as solvent. Besides the named ingredients an adhesive agent is put in the coating in order to guarantee the required resistance to rub off.

Figure 7:
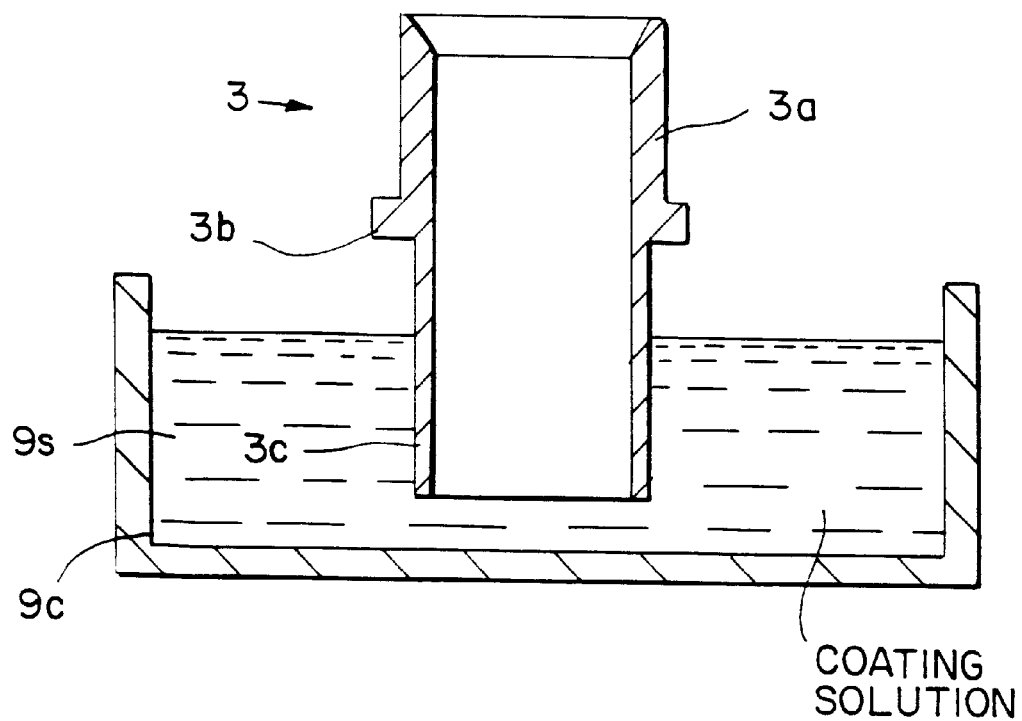
FIG. 7 is a cross-sectional view of one embodiment of the metallic sleeve showing the dipping of the metallic sleeve in a coating solution to form the coating shown in e.g.

The composition for the coating 9 is placed in a suitable container 9c. The metallic sleeve 3 is dipped in the coating solution 9s with its thin-walled portion or section 3c as shown in FIG. 7, drawn out again with a predetermined speed and dried. The coating thickness on the metallic sleeve 3 is adjustable by means of the concentration of the solution 9s and the speed with which the metallic sleeve 3 is withdrawn from the solution.

SECOND STEP: MOUNTING THE OPTICAL FIBER BUNDLE IN THE METALLIC SLEEVE

Figure 3A:
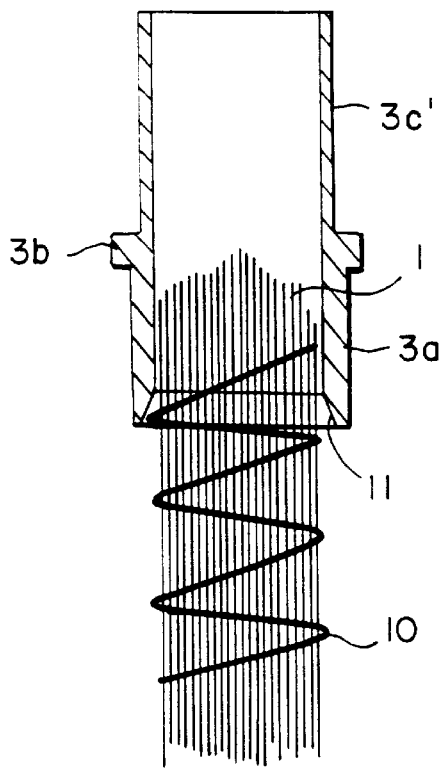
FIGS. 3A, 3B and 3C are respective schematic cross-sectional views of an embodiment of the metallic sleeve with the individual optical fibers showing different stages of the method for making the optical fiber bundle, using a filament as an assembly aid.
Figure 3B:
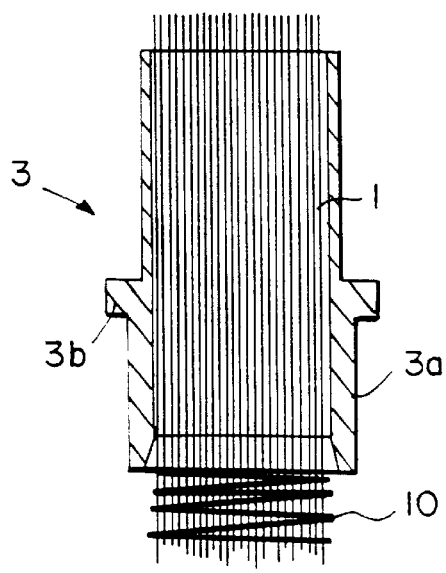
Figure 3C:
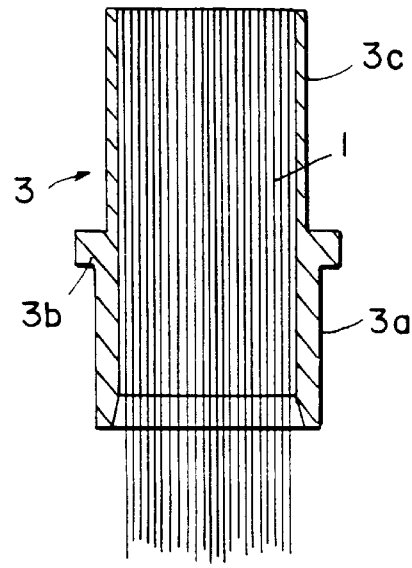

This second step is shown in FIGS. 3A to 3C. The number of individual fibers, i.e. the diameter of the optical fiber bundle 1, is selected so that a snug or press fit between the metallic sleeve 3 and the optical fiber bundle 1 results. However no damage to the outer lying individual fibers can be allowed to occur. The optical fiber bundle must be free from dirt, which can disturb the melting process.

Next the loose individual optical fibers are held together with a narrow filament 10 shown only schematically wound around the optical fiber bundle 1 to form a round densely packed optical fiber bundle 1 (FIG. 3A). The optical fiber bundle thus prepared is pushed from the bottom into the metallic sleeve coated on the upper section. For easy assembly the metallic sleeve 3 has an interior bevel 11 (see also FIGS. 2A and 2B) in section 3a for easy insertion of the optical fiber bundle 1 in the metallic sleeve 3. On insertion of the optical fiber bundle 1 the filament 10 is pushed together (FIG. 3B) or removed. Subsequently the protruding bundle of fibers is cut flush with the metallic sleeve 3, i.e. flush with the upper edge of the thin-walled section 3c.

THIRD STEP: THE OPTICAL FIBER BUNDLE TOGETHER WITH THE METALLIC SLEEVE IS PLACED IN THE CLAMPING DEVICE

This step is performed according to FIG. 1. As already described, the clamping device shown in FIG. 1 has the function of fixing the metallic sleeve 3 in an axial and radial direction to receive the required shaping or withdrawing force 8. A positive-locking engagement of the metallic sleeve 3 in the clamping device 4 for receiving the above-named forces is provided by means of the collar 3b or the groove 3d (FIGS. 2 and 3).

FOURTH STEP: INDUCTIVE HEATING BY MEANS OF THE FORMING TOOL

Figure 4:
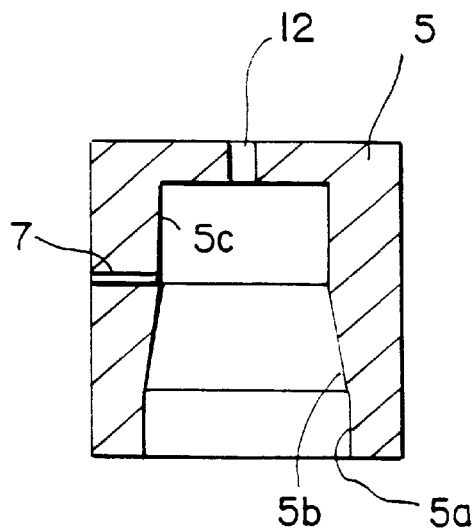
FIG. 4 is a schematic cross-sectional view through a forming tool with a special interior shape.
Figure 5A:
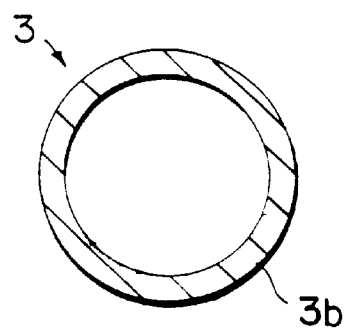
FIGS. 5A and 5B are respective cross-sectional views through the embodiments of the metallic sleeve shown in FIGS. 2A and 2B taken along the corresponding section lines VA and VB, showing the circular shape of the cross-section.
Figure 5B:
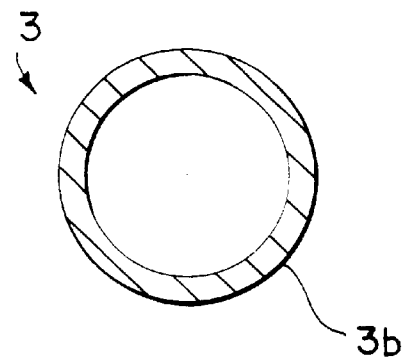

This fourth step is illustrated in FIG. 4. The forming tool 5, which is also shown in FIG. 4, operates as a heating element for uniform heating of the optical fiber bundle to the required forming or shaping temperature. This forming tool 5 preferably is made from stainless steel, which may be heated inductively by means of the induction heater 6 (see FIG. 1) to the required forming temperature. The typical forming temperature is about 650° C. The forming tool 5 is formed so that it is provided with an interior cavity 5a,5b,5c having a first cylindrical section 5a in its lower portion, which has a slightly larger diameter than the metallic sleeve 3 to be shaped in its upper thin-walled section 3c. The diameter difference amounts to preferably less than or equal to 1 mm. The length of the first cylindrical section 5a is typically equal to half of the sleeve 3 inner diameter, however it is not shorter than 5 mm. The first cylindrical region 5a provides a uniform heating of the later-formed region of the optical fiber bundle in the axial direction. The forming tool 5 preferably is closed on its upper side so that in effect an oven arises for homogeneous heating in the radial direction.

A conical section 5b of the interior cavity connects to the cylindrical section 5a and another or second cylindrical section 5c is connected and follows the conical region.

For heating the forming tool 5 is positioned on the metallic sleeve 3 so that the thin-walled upper edge of the metallic sleeve 3 contacts on the conical section 5b of the forming tool 5. The heating is such that the individual fibers in the center of the bundle have a sufficient high temperature for the forming.

The tool temperature is measured by means of a temperature-measuring device 7 and suitably controlled.

FIFTH STEP: SHAPING AND MELTING OF THE INDIVIDUAL FIBERS OF THE OPTICAL FIBER BUNDLE AT THEIR ENDS

This process proceeds according to FIGS. 1 and 4. Besides the functions performed during step 4, the forming tool 5 is for shaping the metallic sleeve 3 in its upper thin-walled section 3c to a definite diameter and melting the optical fibers of the optical fiber bundle together.

The forming tool 5 has the following characteristics in addition to the properties named in step 4:

The side angle between the first cylindrical section 5a and the conical section 5b typically is in an angular range from 4° to 15°. The surfaces of these regions are advantageously hardened and polished. The second cylindrical section 5c connected to the conical part has a diameter, which is selected so that the optical fiber bundle typically after to the shaping process has a diameter corresponding to 85% of the initial diameter of the optical fiber bundle. Also the forming tool surfaces are hardened and polished in the second cylindrical section 5c. As is apparent from FIG. 4, the forming tool 5 has an air hole 12 in its top side, so that air compressed in the forming can escape.

The forming stage proceeds as follows:

After attaining the required forming temperature in process step 4 the forming tool is pressed axially on the metallic sleeve. The axial tool speed is in the range of from 1 to 20 mm/mm, preferably 4 mm/mm. Different length melting zones may be realized according to the travel of the forming tool 5. As the forming tool presses axially on the one end of the optical fiber bundle it shapes or forms the individual optical fibers in a hexagonal packing as shown in the cutaway view of a portion of the end of the optical fiber bundle in FIG. 6.

After finishing the forming process the forming tool 5 is withdrawn from the metallic sleeve 3, so that the formed portion of the metallic sleeve 3 is no longer inside of the second cylindrical section 5c of the forming tool 5.

SIXTH STEP: COOLING OF THE OPTICAL FIBER BUNDLE

The forming tool 5 has the function of controlled and low-stress cooling of the heated formed end of the optical fiber bundle besides the functions described in connection with steps 4 and 5. In this cooling stage the forming tool 5 is brought to a temperature$<<T_g$, preferably 250° C., in the position described in the fifth step (the end of the bundle located outside of the section 5c) according to a predetermined temperature/time behavior. This is accomplished by a continuous lowering of the heating power of the induction heater 6 (FIG. 1). After reaching the predetermined temperature the forming tool 5 is put back into its initial position.

SEVENTH STEP: REMOVAL OF THE OPTICAL FIBER BUNDLE FROM THE CLAMPING DEVICE

After opening of the clamping device 5 (FIG. 1) the optical fiber bundle 1 is removed in a simple manner as a finished product. The forming process is finished.

The end of the optical fiber bundle is subsequently worked or finished (grinding and polishing) by known methods, in order to attain an optical quality end surface.

Figure 6:
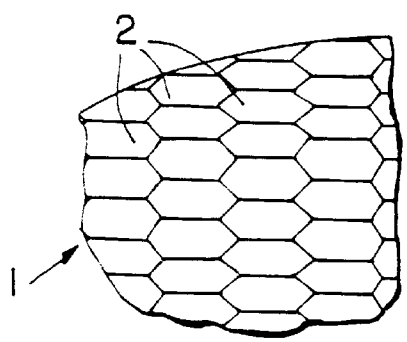
FIG. 6 is a cutaway top view of a portion of the optical fiber bundle held in the metallic sleeve as shown in FIG. 3c taken in the direction of the arrow VI.

The optical fiber bundle made with the described method has the following advantages in contrast to glued optical fibers and optical fibers melted together previously described methods:

greater optically active diameter in relation to the sleeve outer diameter (ratio≧0.8), outstanding transmission through the entire hexagonal close-packed individual optical fibers shown in FIG. 6 over the entire cross-section, greater bundle diameter range (1 to 30 mm) obtainable, a wider variety of sleeve materials usable (nonferrous metals, stainless steel), no additional parts are required besides the sleeve and fiber optic bundle, the length of the melted region is freely selectable, the individual fibers are very well parallel to each other in the melted region, very good centricity of the melted region, very good reproducible process control by active temperature monitoring and control of the forming tool, making of the light guide bundle without metal sleeve is made possible (by subsequent removal of the metal sleeve).

The disclosure in German Patent Application 198 55 958.5-51 of Dec. 4, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of making an optical fiber bundle, optical fiber bundle made thereby and apparatus for performing the method, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making an optical fiber bundle from a plurality of individual optical fibers, said individual optical fibers being made at least in part from glass, said method comprising the steps of:

a) temporarily holding said individual optical fibers together mechanically in a round and densely packed fiber bundle;

b) pushing one end of the round and densely packed optical fiber bundle formed in step a) in a single metallic sleeve in a snug fit, said single metallic sleeve having an interior passage with a substantially circular interior cross-section and being made from a metallic material that has a sufficient high temperature strength at a forming temperature of said glass in said optical fibers;

c) installing the optical fiber bundle in a horizontally movable clamping device with the clamping device arranged in the vicinity of the single metallic sleeve in order to hold the optical fiber bundle fixed in an axial and radial direction;

d) heating the one end of the optical fiber bundle pushed in the single metallic sleeve to said forming temperature with a single heated forming tool and, at the same time as the heating, compressing the one end of the optical fiber bundle pushed in the single metallic sleeve by pressing said single heated forming tool axially against said one end of the optical fiber bundle to shape or form the individual optical fibers in a hexagonal packing, without sealing the single metallic sleeve to the optical fiber bundle;

e) cooling the one end of the optical fiber bundle with the individual optical fibers in the hexagonal packing; and f) removing the optical fiber bundle from the clamping device.

2. The method as defined in claim 1, further comprising coating a portion of the single metallic sleeve to form a coating on an inner wall of said portion of the single metallic sleeve, thus providing a separating layer between the optical fiber bundle and the inner wall of the single metallic sleeve, and also on an outer wall of said portion of the single metallic sleeve, thus providing a lubricating layer between the outer wall of the single metallic sleeve and said single heated forming tool for shaping or forming the individual optical fibers to form the hexagonal packing.

3. The method as defined in claim 2, wherein said coating is made from a coating material and said coating material comprises boron nitride suspended in ethanol.

4. The method as defined in claim 3, further comprising dipping said single metallic sleeve in said coating material to form said coating.

5. The method as defined in claim 1, wherein the temporarily mechanically holding of the individual optical fibers together in a round and densely packed fiber bundle occurs prior to insertion in the single metallic sleeve by means of a bundling device that is manually removable or automatically stripped away from the round and densely packed fiber bundle by the single metallic sleeve when the fiber bundle is pushed in the single mechanical sleeve.

6. The method as defined in claim 1, wherein said heating of the one end of the optical fiber bundle to the forming temperature occurs by inductively heating a single forming tool to provide the single heated forming tool when the single forming tool is in contact with the one end of the optical fiber bundle.

7. The method as defined in claim 6, wherein the forming temperature is in a temperature range from 600 to 700° C.

8. The method as defined in claim 6, wherein the cooling of the one end of the optical fiber bundle occurs by gradual reduction of an inductive heating rate of the inductively heating.

9. The method as defined in claim 1, further comprising cutting off protruding end portions of the individual optical fibers after pushing the optical fiber bundle in the single metallic sleeve so that said individual optical fibers end flush with an edge of said single metallic sleeve.

10. The method as defined in claim 1, wherein said forming tool is cooled and cools the one end of the optical fiber bundle during the cooling.

* * * * *